May 15, 1928.

C. C. HUPP 1,670,260

METALLIC INNER TUBE

Filed Oct. 11, 1924

Charles C. Hupp
INVENTOR

BY Victor J. Evans
ATTORNEY

WITNESS

Patented May 15, 1928.

1,670,260

UNITED STATES PATENT OFFICE.

CHARLES C. HUPP, OF DOE RUN, MISSOURI.

METALLIC INNER TUBE.

Application filed October 11, 1924. Serial No. 743,080.

The object of this invention is the provision of a yieldable metal inner tube for tire casings of a nature which will permit of the yielding of the casing under rough road conditions, which will materially strengthen the said casing and which is practically puncture-proof.

A further object is the provision of a metal inner tube for tire casings comprising a hollow ring member substantially circular in cross section and having its confronting edges enlarged, rounded and spaced from each other a sufficient distance to receive therebetween a yieldable annular gasket which will prevent the edges of the tube being brought against each other when subject to undue stress, and likewise serve as a buffer element for the said edges when the tube is subjected to such stress.

To the attainment of the foregoing broadly stated objects and others which will appear as the nature of the invention is better understood, reference is to be had to the drawings which accompany and which form part of this application.

In the drawings:—

Figure 1:
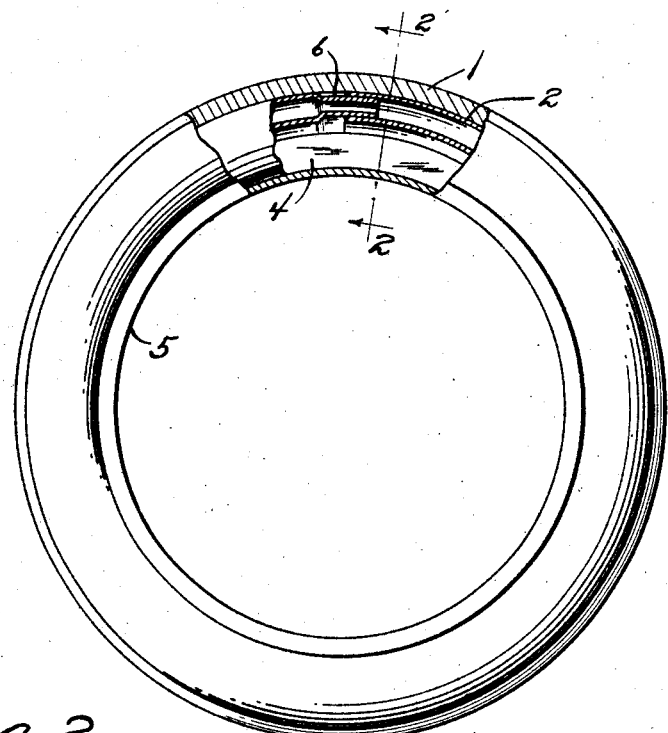
Figure 1 is a side elevation of a tire having an inner tube in accordance with this invention, a part of both the tire and tube being in section.
Figure 2:
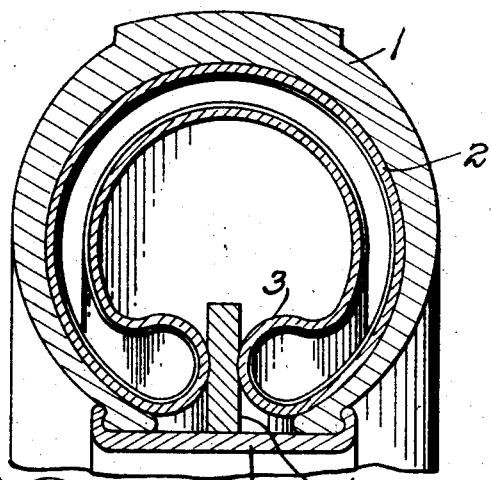
Figure 2 is an enlarged sectional view on the line 2—2 of Figure 1.

In Figure 1 of the drawings, I have shown the inner tube transversely split, one end telescopically received in the other. This telescopic arrangement is only necessary to allow for the increased diameter of the tube when fitting over clincher rims. Preferably the tire casing 1 is built around the tube. The tube, indicated by the numeral 2, is of spring metal and comprises a hollow ring member, the confronting edges of which being enlarged by rounding the same, as indicated by the numeral 3. Between the said confronting edges there is arranged on the tire carrying rim of the wheel an annular compressible gasket 4. The tendency of the confronting edges of the tube are to spring away from each other and thereby force the ribs of the casing 1 tightly into the beads of the tire carrying rim 5.

In the showing of Figure 1, the inner tube is transversely split and has one end formed with a reduced neck-like extension 6 which is snugly received in the other end of the tube.

A metal inner tube, together with the gasket 4 will effectively supplant the ordinary rubber inner tube and permit of a greater yielding of the tire casing than any other like construction with which I am acquainted. The device renders the tire practically puncture-proof, but even should an obstacle pass through the tire and enter the tube it would not materially interfere with either of these elements as no air is employed in the inner tube. Also it is to be understood that the tube may be used with any ordinary automobile tire without being built into the same.

Having described the invention, I claim:—

In combination with a rim having a radially extending centrally located gasket, and a tire mounted thereon, a resilient metallic inner tube, having a reentrant partition forming a tubular member co-axial with said tube, and an annular slot on the inner periphery of said inner tube, the connection between the tube and tubular member being rounded, and being adapted to grip the radially extending gasket therebetween.

In testimony whereof I affix my signature.

CHARLES C. HUPP.